United States Patent
Frank et al.

(10) Patent No.: US 10,560,604 B2
(45) Date of Patent: Feb. 11, 2020

(54) HALFTONE SCREENS (71) Applicant: HP INDIGO B.V., Amstelveen (NL)

(72) Inventors: Tal Frank, Ness Ziona (IL); Oren Haik, Ness Ziona (IL); Dror Kella, Ness Ziona (IL); Ram Dagan, Modiin (IL); Marina Limonov, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/760,299

(22) PCT Filed: Sep. 29, 2015

(86) PCT No.: PCT/EP2015/072484
§ 371 (c)(1),
(2) Date: Mar. 15, 2018

(87) PCT Pub. No.: WO2017/054852
PCT Pub. Date: Apr. 6, 2017

(65) Prior Publication Data
US 2018/0270394 A1 Sep. 20, 2018

(51) Int. Cl.
*H04N 1/52* (2006.01)
*H04N 1/405* (2006.01)
*B41F 15/10* (2006.01)

(52) U.S. Cl.
CPC ............ *H04N 1/52* (2013.01); *H04N 1/405* (2013.01); *B41F 15/10* (2013.01)

(58) Field of Classification Search
USPC ....................................... 358/1.15
See application file for complete search history.

(56) References Cited

U.S. PATENT DOCUMENTS

| | | | | |
|---|---|---|---|---|
| 5,166,809 A | * | 11/1992 | Surbrook | H04N 1/4058 101/211 |
| 6,357,800 B1 | * | 3/2002 | Muller | G07D 7/0057 283/93 |
| 8,355,189 B2 | | 1/2013 | Shacham et al. | |
| 2003/0035145 A1 | | 2/2003 | Wang | |
| 2006/0279789 A1 | | 12/2006 | Yamazaki et al. | |
| 2008/0291500 A1 | | 11/2008 | Asai | |

(Continued)

FOREIGN PATENT DOCUMENTS

EP 0583776 A 2/1994

OTHER PUBLICATIONS

Velho, L. et al., "Color Halftoning with Stochastic Dithering and Adaptive Clustering", Dec. 10, 2001, 7 pages.

*Primary Examiner* — Tammy Paige Goddard
*Assistant Examiner* — Darryl V Dottin
(74) *Attorney, Agent, or Firm* — HP Inc. Patent Department (57) ABSTRACT

An example system includes a color engine to separate an image into a plurality of color components. The system also includes a halftone engine to generate a plurality of halftone images based on the plurality of color components and a plurality of halftone screens. For each halftone screen, the halftone cell centers for that halftone screen occur at regular or semi-regular distances relative to a dot pitch. The plurality of halftone screens forms a high frequency moire pattern when the halftone screens are overlaid on each other. Each of the halftone screens have a granularity metric less than a threshold.

16 Claims, 6 Drawing Sheets

(56) References Cited

U.S. PATENT DOCUMENTS

| | | | |
|---|---|---|---|
| 2009/0180152 A1* | 7/2009 | Bala | H04N 1/387 |
| | | | 358/3.28 |
| 2010/0021194 A1 | 1/2010 | Toyohara et al. | |
| 2011/0141525 A1 | 6/2011 | Ng et al. | |
| 2011/0279831 A1 | 11/2011 | Shacham et al. | |
| 2012/0133990 A1 | 5/2012 | Wang et al. | |
| 2015/0062674 A1 | 3/2015 | Horita | |

* cited by examiner

```
┌─────────────────────────────────────────────────────┐
│  Determine a Plurality of Halftone Screens Each Having a  │
│   Granularity Metric Less than a Granularity Threshold    │
│                         302                          │
└─────────────────────────────────────────────────────┘
                           │
┌─────────────────────────────────────────────────────┐
│  Compute a Plurality of Moiré Frequencies for Each of a  │
│    Plurality of Subsets of the Plurality of Halftone Screens │
│                         304                          │
└─────────────────────────────────────────────────────┘
                           │
┌─────────────────────────────────────────────────────┐
│  Select a Subset for Which Each Moiré Frequency Is Greater │
│     than a Frequency Threshold as a Halftone Screen Set   │
│                         306                          │
└─────────────────────────────────────────────────────┘
```

HALFTONE SCREENS

BACKGROUND

Printers are generally unable to adjust the color or colour intensity or gray level of printing fluid delivered to a medium. To produce the appearance of a wide printed color gamut, with variations in the color intensity, the size or spacing of printed dots may be varied. The human eye may interpret small dots or largely spaced dots as having a lesser color intensity than large dots or dots with small spacing. In an example, the printer may print dots with fixed sizes, but the printer may vary how many dots are printed in cells with predetermined sizes. The apparent color intensity of a cell may be proportional to how many dots are printed in the cell.

DETAILED DESCRIPTION

A halftone screen may specify the locations and sizes of cells used to produce halftone representations of color intensities or gray levels. In an example, a printer may be able to print dots at predetermined locations. For any dot, the nearest neighboring dots may be located in two orthogonal directions. Accordingly, the dots may form a grid. The cells in a halftone screen may also form an orthogonal grid. The cell grid and the dot grid may be aligned with each other, or the cell grid may be rotated relative to the dot grid. The locations and sizes of cells in a halftone screen may be indicated by a number of lines per inch and a screen angle relative to the dot grid.

As used herein, the term "dot" refers to the smallest element that can be printed by a particular printer. The term "cell" refers to a plurality of dots used to produce a halftone representation of a color intensity or gray level. The terms "dot grid" and "cell grid" refer to the grids that would be created by drawing lines connecting centers of all printable dots or all cells in a halftone screen, respectively. The angle of the cell grid relative to the dot grid is referred to herein as the "screen angle." The term "lines per inch" (LPI) refers to the number of cells that can be printed per inch when traveling along a cell gridline. The term "dots per inch" (DPI) refers to the number of dots that can be printed per inch when traveling along a dot gridline. As used herein, the term "halftone screen" refers to data or a mechanical screen that specifies or determines the locations of cells. A plurality of halftone screens for printing a plurality of colors is referred to herein as a "halftone screen set" or "screen set." The printer may be a two-dimensional (2D) or three-dimensional (3D) printer to produce a 2D or 3D print, and the dots and cells may be 2D or 3D. The screen angle may include a single component or multiple components.

For a polychromatic printer, there may be a halftone screen for each color. When the screens for the different colors are overlaid on each other, the relative locations of cells in the different halftone screens may vary periodically and create moiré patterns noticeable to a viewer. In an example, the halftone screens of a four-color printing system may have a same LPI and be positioned at angles of 0, 15, 45, and 75 degrees. In such an arrangement, the halftone screens form circular rosette structures. The rosette structures produce a rosette moiré, which viewers do not find as objectionable as other moiré patterns. The repetitive structure of the rosettes may create a smooth print. As used herein, the term "smooth" refers to screen sets that produce prints with low graininess/granularity.

However, the rosette structure may be very sensitive to misregistration of the halftone screens. Small variations in relative cell locations between the halftone screens, such as shifts on the order of 10 microns, may cause the rosettes to shift from being clear centered to being dot centered. Such variations can easily result from deformation of the print media or deformation of the print and may be hard to prevent in some printing systems. The reflected optical density (OD) and color may change noticeably between clear-centered rosettes and dot-centered rosettes. Thus, the rosette structure has low robustness to misregistration. As used herein, the term "robust" refers to how sensitive a set of halftone screens is to changes in color or OD due to variations between the relative positions of the screens.

A more robust screen set may be produced by varying the LPI or screen angles of the halftone screens included in the screen set. The variations in LPI or screen angles may be selected to produce a high frequency moiré pattern. The frequency of the moiré pattern may be high enough that the moiré pattern will not be perceived by a viewer. For example, the frequency of the moiré pattern may be at least 40 LPI, 60 LPI, 70 LPI, 80 LPI, 85 LPI, 90 LPI, 100 LPI, or the like. In addition, the high frequency moiré pattern may have a high robustness to misregistration. A similar high frequency moiré pattern may be produced even if there are variations in cell locations between the halftone screens. However, the screens used to produce the high frequency moiré pattern may be very grainy. Thus, the smooth screens may have a low robustness, and the robust screens may have a low smoothness.

Figure 1:
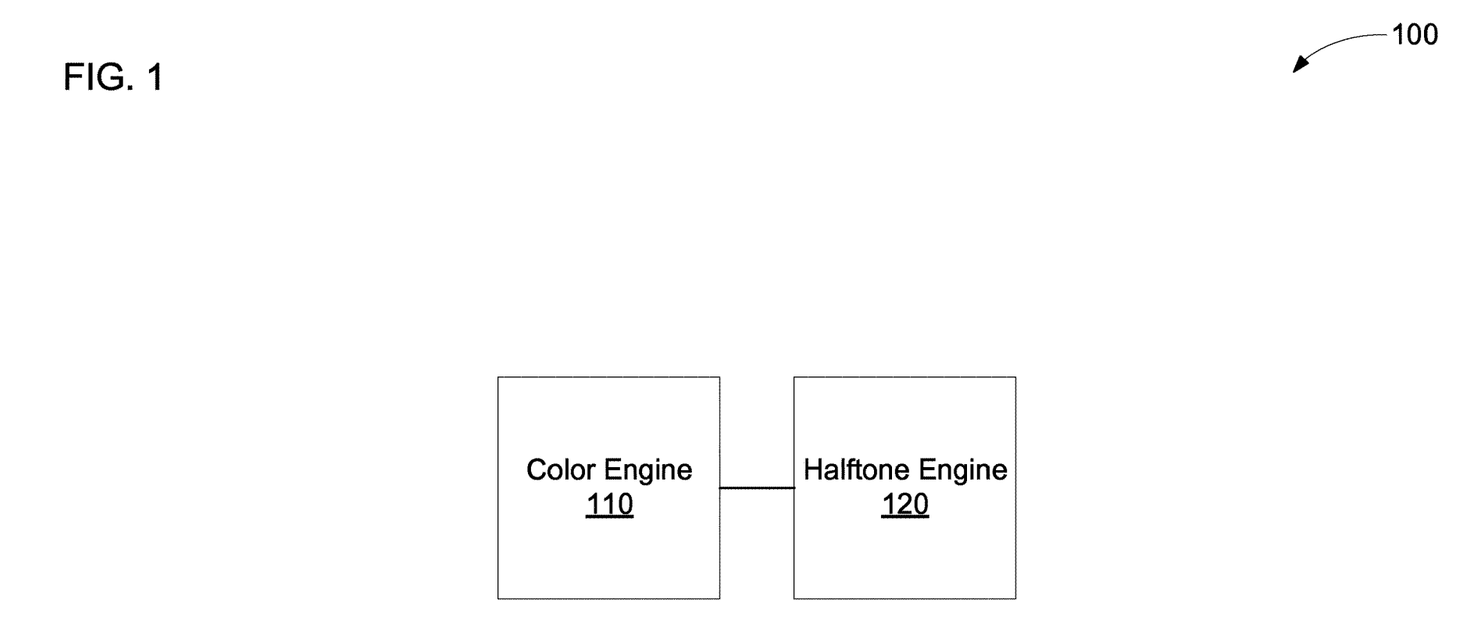
FIG. 1 is a block diagram of an example system to convert an image to a plurality of halftone images based on a plurality of halftone screens.

FIG. 1 is a block diagram of an example system 100 to convert an image to a plurality of halftone images based on a plurality of halftone screens. The system 100 may include a color engine 110. The color engine 110 may separate the image into a plurality of color components of the image. In some examples, the color engine 110 may convert the image from a first color space to a second color space. The color engine 110 may extract the color intensity of each color in the final color space for each pixel to produce the color component corresponding to that color. As used herein, the term "engine" refers to hardware (e.g., a processor, such as an integrated circuit, or analog or digital circuitry) or a combination of software (e.g., programming such as machine- or processor-executable instructions, commands, or code such as firmware, a device driver, programming, object code, etc.) and hardware. Hardware includes a hardware element with no software elements, such as an application specific integrated circuit (ASIC), a Field Programmable Gate Array (FPGA), etc. A combination of hardware and software includes software hosted at hardware (e.g., a software module that is stored at a processor-readable memory, such as random access memory (RAM), a hard-disk or solid-state drive, resistive memory, or optical media such as a digital versatile disc (DVD), or executed or interpreted by a processor), or hardware and software hosted at hardware.

The system 100 may also include a halftone engine 120. The halftone engine 120 may generate a plurality of halftone images based on the plurality of color components and a plurality of halftone screens. The halftone engine 120 may use a halftone screen to determine cell locations. The halftone engine 120 may determine a color intensity for each cell location based on the color component corresponding to the halftone screen. The halftone engine 120 may generate a halftone representation of each determined color intensity for the corresponding cell location. The halftone engine 120 may generate the halftone image from the halftone representations for each cell location.

Each halftone screen in the plurality of halftone screens may have halftone cell centers that occur at regular or semi-regular distances relative to a dot pitch. As used herein, the term "dot pitch" refers to the distance between adjacent dots along a dot gridline. The dot pitch may be the inverse of the DPI. The dot pitch may be that of a printer for which the halftone images are generated. As used herein, the term "semi-regular distances" refers to distances for which the ratio of the distance between adjacent cell centers to the dot pitch is a rational number with a small denominator (e.g., a denominator less than or equal to 2, 4, 5, 10, 20, or the like). As used herein, the term "regular distance" refers to distances for which the ratio of the distance between adjacent cell centers to the dot pitch is a rational number with a denominator equal to one. Cell centers may occur at a regular or semi-regular distance if the distance between cell centers along each dimension of the dot grid is a regular or semi-regular distance even though the absolute distance is not a regular or semi-regular distance. Alternatively, or in addition, the absolute distance between cell centers may be a regular or semi-regular distance. The cells may be symmetrical, so the cell edges, cell corners, etc. may also occur at regular or semi-regular distances relative to the dot pitch. Halftone screens with cell centers that occur at regular or semi-regular distances may be smoother than halftone screen with cell centers that do not occur at regular or semi-regular distances.

The plurality of halftone screens may form a high frequency moiré pattern when the halftone screens are overlaid on each other. The plurality of halftone screens may be selected so the high frequency moiré pattern is not visible to viewers. For example, the LPI and screen angle of each screen may be selected so the interference pattern produced by the overlaid screens includes only high frequency components. The high frequency moiré pattern may be robust to misregistration. Accordingly, the plurality of halftone screens may be smooth and have a high robustness to misregistration.

Figure 2:
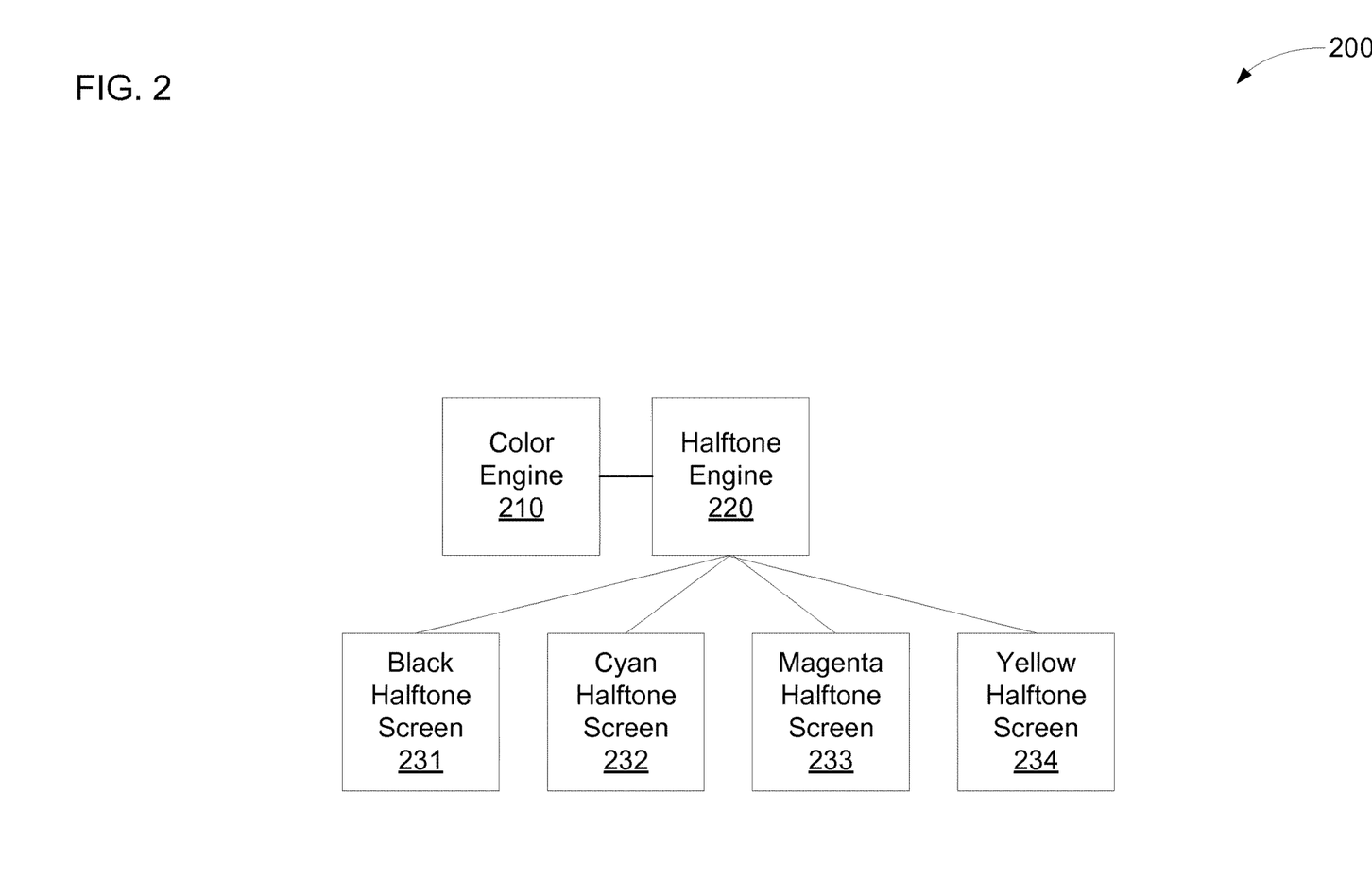
FIG. 2 is a block diagram of another example system to convert an image to a plurality of halftone images based on a plurality of halftone screens.

FIG. 2 is a block diagram of another example system 200 to convert an image to a plurality of halftone images based on a plurality of halftone screens 231-234. The system 200 may include a color engine 210 to separate an image into a plurality of color components. The system 200 may also include a halftone engine 220 to generate a plurality of halftone images based on the plurality of color components and the plurality of halftone screens 231-234. In the illustrated example, the system 200 includes a black halftone screen 231, a cyan halftone screen 232, a magenta halftone screen 233, and a yellow halftone screen 234. In other examples, the system 200 may include more or fewer halftone screens and may include halftone screens for colors besides black, cyan, magenta, and yellow.

Each halftone screen 231-234 may be selected so that the cell centers for that screen occur at regular or semi-regular distances relative to a dot pitch. For example, each halftone screen 231-234 may have a regularity index less than or equal to 10. The regularity index of a halftone screen may be determined based on basis vectors for the halftone screen. The basis vectors may be vectors from a center of a cell in the halftone screen to centers of the cell's nearest neighbors. Cartesian representations of the basis vectors relative to the dot grid may be determined. For example, basis vectors of a 2D halftone screen may be specified in Cartesian form using the equations:

$$\vec{n}_1^i = \frac{DPI}{LPI_i}(\cos\phi_i, \sin\phi_i) = CellSize_i(\cos\phi_i, \sin\phi_i) \quad (1)$$

$$\vec{n}_2^i = \frac{DPI}{LPI_i}(-\sin\phi_i, \cos\phi_i) = CellSize_i(-\sin\phi_i, \cos\phi_i) \quad (2)$$

Where i is an index indicating the particular halftone screen, $\vec{n}_1^i$ and $\vec{n}_2^i$ are the basis vectors, and $\phi_i$ is the screen angle. The cell size is defined in equations 1 and 2 as the ratio between the DPI of the dot grid and the LPI of the halftone screen.

The basis vectors may be expressed as rational numbers. For example, the basis vectors may be expressed according to the equations:

$$\vec{n}_1^i = \left(\frac{p_1^i}{q_1^i}, \frac{p_2^i}{q_2^i}\right); \vec{n}_2^i = \left(-\frac{p_2^i}{q_2^i}, \frac{p_1^i}{q_1^i}\right) \quad (3)$$

Where $p_1$, $p_2$, $q_1$, $q_2$ are restricted to the integers. The regularity index of the halftone screen may be determined based on a least common multiple of the denominators of each component of the basis vectors. In this example, the denominators may be the same for both basis vectors but rearranged among components, so the regularity index may be computed based on the least common multiple of the denominators of one basis vector. In an example, the regularity index may computed according to the equation:

$$\text{RegularityIndex}_i = lcm(q_1^i, q_2^i) \quad (4)$$

Where lcm is a function that outputs the least common multiple.

The regularity index of each halftone screen 231-234 may correspond inversely with the smoothness and directly with the graininess/granularity. For example, a halftone screen with a regularity index of 100 may not be smooth, but halftone screens with regularity indexes less than or equal to 1, 2, 4, 5, 10, 20, etc. may be smooth. In an example, the halftone screens 231-234 may have a regularity index less than or equal to two. In an example, if the halftone screens 231-234 have different regularity indexes, a color for which viewers have a lower sensitivity to granularity may be selected to have a higher regularity index. The yellow halftone screen 234 may be selected to have the higher regularity index in an example. Similarly, a color for which viewers have a higher sensitivity to granularity may be selected to have a lower regularity index.

Each halftone screen 231-234 may be selected so that magnitudes of all moiré frequency vectors for each of a plurality of moiré orders are greater than or at least a corresponding minimum frequency. A frequency vector may indicate how often cells in a halftone screen repeat and the direction of that repetition. Each halftone screen 231-234 may have a plurality of frequency vectors. For example, the fundamental frequency vectors of a 2D halftone screen may be specified by the equations:

$$\vec{f}_1^i = \frac{LPI_i}{DPI}(\cos\phi_i, \sin\phi_i) = \frac{1}{CellSize}(\cos\phi_i, \sin\phi_i) \quad (5)$$

$$\vec{f}_2^i = \frac{LPI_i}{DPI}(-\sin\phi_i, \cos\phi_i) = \frac{1}{CellSize}(-\sin\phi_i, \cos\phi_i) \quad (6)$$

Where i and $\phi_i$ have the same meaning as in equations 1 and 2 and $\vec{f}_{1\,1}^{\,i}$ and $\vec{f}_{1\,2}^{\,i}$ are the fundamental frequency vectors.

A moiré frequency vector may be computed by adding together fundamental frequency vectors from the plurality of halftone screens 231-234. The fundamental frequency vectors may be multiplied by integer coefficients when computing the moiré frequency vector. The moiré order of a moiré frequency vector may be the sum of the absolute values of the integer coefficients. For any moiré order, all moiré frequency vectors of that or a lesser order may be computed, for example, by selecting all possible combinations of integer coefficients for each moiré order. The magnitudes of the moiré frequency vectors may be compared to the minimum frequency for that moiré order to determine if the moiré frequency vectors are greater than or at least the minimum frequency.

For example, the moiré frequency vector may be compared to the minimum frequency according to the equation:

$$\|\vec{f}_{moire}\| = \left\|\sum_{i,j}\alpha_j^i \vec{f}_j^{\,i}\right\| > f_{min} \quad (7)$$

Where $\vec{f}_{moire}$ is the moiré frequency vector, i is an index indicating the particular halftone screen, j is an index indicating the particular fundamental frequency vector for that halftone screen, $\vec{f}_j^{\,i}$ is the fundamental frequency vector indicated by the index values, $\alpha_j^i$ is the integer coefficient for the fundamental frequency vector indicated by the index values, and $f_{min}$ is the minimum frequency. The magnitude of the moiré frequency vector is referred to herein as the "moiré frequency." In an example, equation 7 may be computed for all integer coefficients that satisfy the equation:

$$\sum_{i,j}|\alpha_j^i| < O_{max} \quad (8)$$

Where i, j, and $\alpha_j^i$ have the same meaning as in equation 7 and $O_{max}$ is the maximum moiré order, a cutoff above which moiré patterns are not noticeable to viewers. The maximum moiré order may be four, five, six, seven, eight, nine, etc. in some examples.

The minimum frequency may be a cutoff above which the moiré will not be noticeable to a viewer. The minimum frequency may vary depending on the viewing distance of the viewer and the moiré order. In an example, the minimum frequency may be selected based on the equation:

$$f_{min} = \frac{c}{O} \quad (9)$$

Where $f_{min}$ is the minimum frequency, c is a constant, and O is the moiré order. In some examples, the constant may be 80 LPI, 100 LPI, 120 LPI, 150 LPI, 170 LPI, 200 LPI, or the like. For example, for a viewing distance of 30 centimeters (cm), the constant may be 170 LPI. Moiré patterns of order two may not be noticeable to the human eye at frequencies greater than or at least 85 LPI, and moiré patterns of order three may not be noticeable at frequencies greater than or at least approximately 57 LPI. In other examples, a relationship other than the one specified by equation 9 may exist between the moiré order and the minimum frequency, and a minimum frequency for each moiré order may be selected based on the other relationship, based on observation or experimentation, or the like.

In an example, a first plurality of halftone screens may satisfy equation 7 for all integer coefficients satisfying equation 8, and a second plurality of halftone screens may separately satisfy equation 7 for all integer coefficients satisfying equation 8. The first and second pluralities may have common elements but may not be identical. The combination of the first plurality and the second plurality may not satisfy equation 7 for all integer coefficients satisfying equation 8. For example, a screen set may be designed to have the black, cyan, and magenta halftone screens 231-233 satisfy equation 7 together. The screen set may be designed to have the yellow halftone screen 234 satisfy equation 7 in combination with each of the black, cyan, and magenta halftone screens 231-233 individually, but a larger combination including all four halftone screens 231-234 may not need to satisfy equation 7. The viewer may be less sensitive to moiré patterns that include yellow.

In an example, the DPI may be 812.8. The black halftone screen 231 may have an LPI of 225 and an angle of 34 degrees. The cyan halftone screen 232 may have an LPI of 225 and an angle of 56 degrees. The magenta halftone screen 233 may have an LPI of 144 and an angle of 45 degrees. The yellow halftone screen 234 may have an LPI of 230 and an angle of 82 degrees. The black, cyan, and magenta halftone screens 231-233 may each have a regularity index of one, and the yellow halftone screen 234 may have a regularity index of two. The lower LPI of the magenta halftone screen 233 may cause it to have more dots per cell and thus may allow, for example, for the rendering of smoother faces. In another example, the parameters of the cyan and magenta halftone screens 232-233 may be swapped to render, for example, smoother skies.

Figure 3:
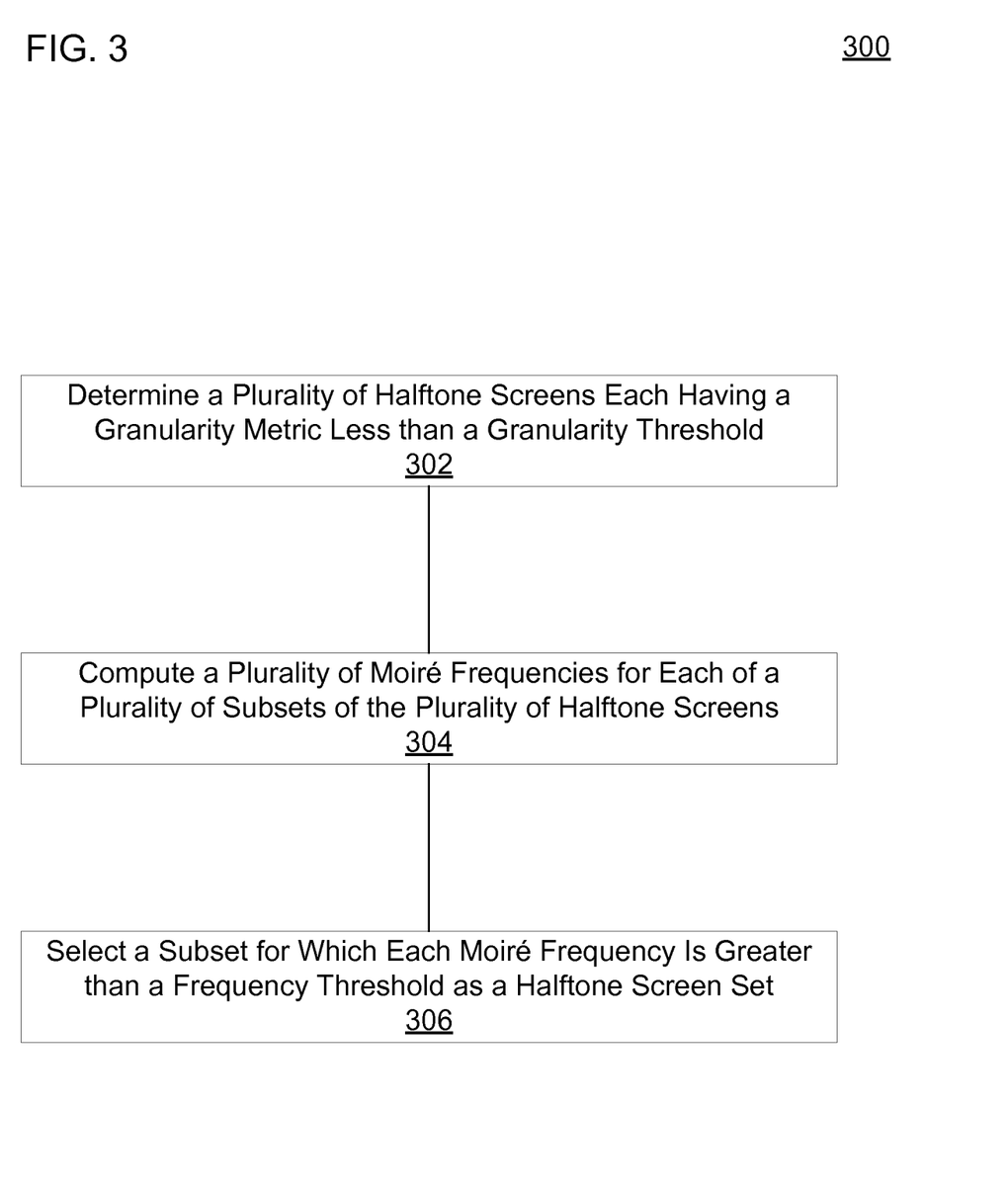
FIG. 3 is a flow diagram of an example method to generate a plurality of halftone screens that are smooth and robust to misregistration.

FIG. 3 is a flow diagram of an example method 300 to generate a plurality of halftone screens that are smooth and robust to misregistration. The method 300 may be performed using a processor. At block 302, the method 300 may include determining a plurality of halftone screens each having a granularity metric less than a granularity threshold. For example, a large number of halftone screens may be determined to create a pool that can be drawn from to perform additional evaluations. The granularity metric may be a calculation of the effects that the screen parameters will have on granularity. In some examples, additional predetermined criteria may be used to determine the plurality of halftone screens. For example, the plurality of halftone screens may be restricted to a predetermined range of LPIs. The predetermined range of LPIs may be LPIs large enough that the halftone cells will not be noticeable to viewers and small enough that the halftone cells can represent a sufficient number of different color intensities.

Block 304 may include computing a plurality of moiré frequencies for each of a plurality of subsets of the plurality of halftone screens. For example, a subset may be selected from the plurality of halftone screens determined at block 302, and a plurality of moiré frequencies may be calculated for that subset. Another subset may be selected, and another plurality of moiré frequencies may be calculated. Block 306 may include selecting a subset for which each moiré frequency is greater than or at least a frequency threshold. The subset may be selected for use as a halftone screen set. In an example, blocks 304 and 306 may be performed concurrently. For example, each moiré frequency may be compared to the frequency threshold before the next moiré frequency is computed. If a moiré frequency is less than or not more than the frequency threshold, the subset may be rejected. Otherwise, if all the computed moiré frequencies are compared to the frequency threshold and the subset is not rejected, it may be selected as a halftone screen set. In an example, the method 300 may generate the plurality of halftone screens 231-234 of FIG. 2.

Figure 4:
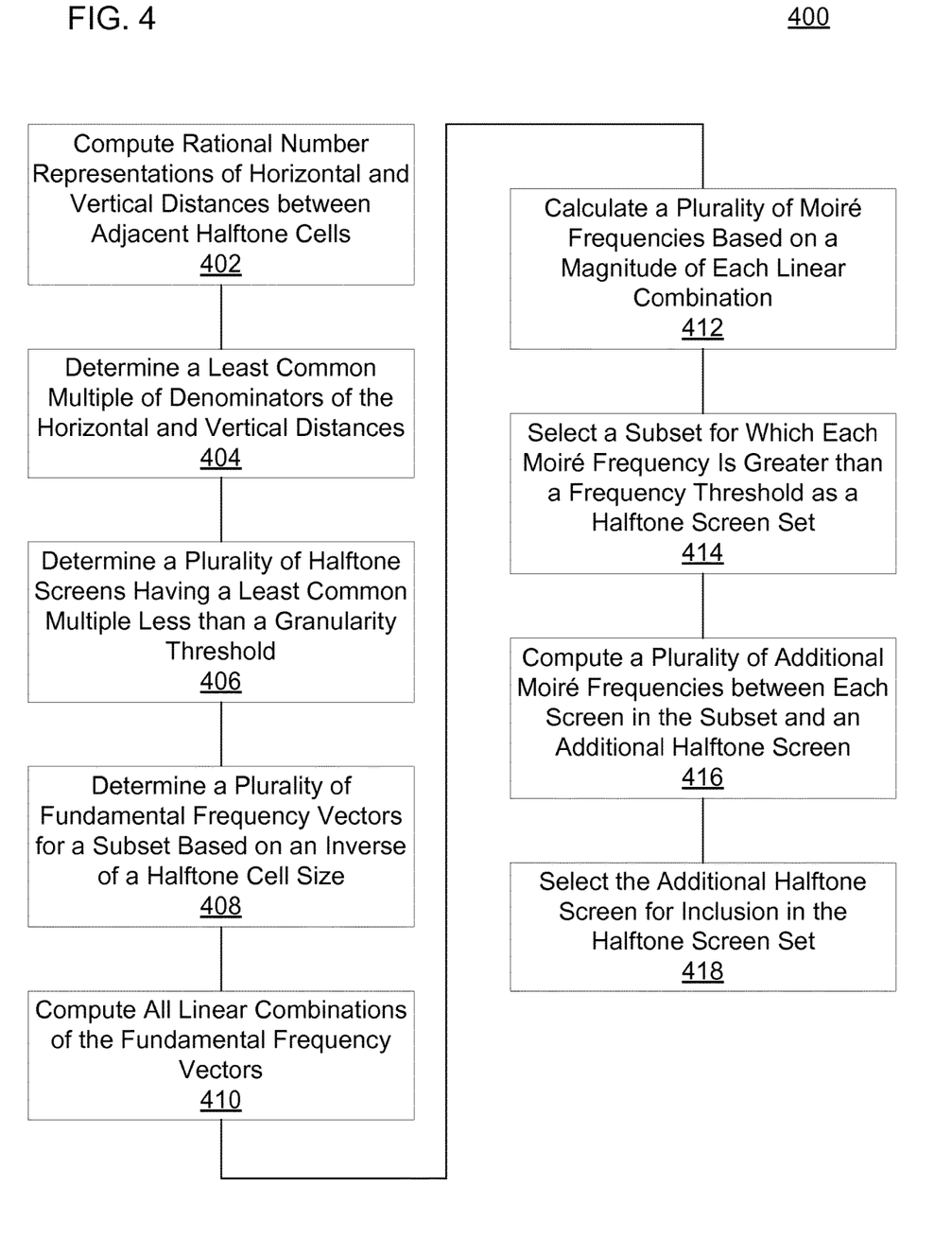
FIG. 4 is a flow diagram of another example method to generate a plurality of halftone screens that are smooth and robust to misregistration.

FIG. 4 is a flow diagram of another example method 400 to generate a plurality of halftone screens that are smooth and robust to misregistration. The method 400 may be performed using a processor. At block 402, the method 400 may include computing rational number representations of horizontal and vertical distances between adjacent halftone cells in a halftone screen. As used herein, the terms "horizontal" and "vertical" refer to first and second directions along the dot grid. The horizontal and vertical directions may be orthogonal in some examples. The rational number representations may be computed according to equations 1-3 in an example. The horizontal and vertical distances may be first and second components of a basis vector.

Block 404 may include determining a least common multiple of denominators of the horizontal and vertical distances. For example, the least common multiple may be computed according to equation 4. The least common multiple computed according to blocks 402 and 404 may be a granularity metric for the halftone screen. Block 406 may include determining a plurality of halftone screens each having a least common multiple less than or no more than a predetermined granularity threshold. For example, blocks 402 and 404 may be performed for a plurality of halftone screen, and each halftone screen may be compared to the predetermined granularity threshold. The predetermined granularity threshold may be 1, 2, 4, 5, 10, 20, or the like. In some examples, the plurality of halftone screens may be restricted to a predetermined range of LPIs. In an example, the plurality of halftone screens may be determined by selecting a least common multiple, determining a corresponding set of denominators, and determining all basis vectors in the range of LPIs having denominators in the set.

At block 408, the method 400 may include determining a plurality of fundamental frequency vectors based on an inverse of a halftone cell size and an angle of each halftone screen. For example, the plurality of fundamental frequency vectors may be determined according to equations 5 and 6. The fundamental frequency vectors may be determined for all halftone screens determined at block 406, or the fundamental frequency vectors may be determined for a subset of the halftone screens determined at block 406.

Block 410 may include computing all linear combinations of the fundamental frequency vectors that have integer coefficients with an absolute sum less than a predetermined moiré order threshold. As used herein, the term "absolute sum" refers to a sum of absolute values. All linear combinations may be computed for a subset of the plurality of halftone screens determined at block 406. The subset may be selected at block 408 or at block 410. In an example, the linear combinations of fundamental frequency vectors may be computed according to the summation in equation 7, and the integer coefficients with an absolute sum less than a predetermined moiré order threshold may be determined according to equation 8.

Block 412 may include calculating a plurality of moiré frequencies based on a magnitude of each linear combination. Block 414 may include selecting a subset for which each moiré frequency is greater than a predetermined frequency threshold as a halftone screen set. For example, blocks 412 and 414 may be performed according to equation 7. Blocks 410-414 may be repeated for a plurality of subsets of halftone screens. For examples, blocks 410-414 may be repeated until a halftone screen set is selected, for all possible subsets of the plurality of halftone screens determined at block 406, a predetermined number of times, or the like. In some examples, block 414 may include selecting a subset for which each moiré frequency of a first order is greater than a first predetermined frequency threshold and each moiré frequency of a second order is greater than a second predetermined frequency threshold. For example, the first and second predetermined frequency thresholds may be selected according to equation 9 (e.g., using a constant of 80 LPI, 100 LPI, 120 LPI, 150 LPI, 170 LPI, 200 LPI, etc.). Thus, in an example, the first order may be two; the first predetermined threshold may be 85 LPI, the second order may be three; and the second predetermined threshold may be approximately 57 LPI.

At block 416, the method 400 may include computing a plurality of additional moiré frequencies between each halftone screen in a selected subset and an additional halftone screen having a granularity metric less than an additional predetermined granularity threshold. The additional predetermined granularity threshold may be the same as or different from the predetermined granularity threshold used in block 406. For example, the additional predetermined granularity threshold may be greater than or less than the predetermined granularity threshold. Accordingly, block 416 may include evaluating halftone screens to determine the additional halftone screen that has the granularity metric less than the additional predetermined granularity threshold.

In an example, the plurality of additional moiré frequencies may be computed according to equation 7. The additional moiré frequencies may be computed for each halftone screen in the selected subset in an individual combination with the additional halftone screen. For example, additional moiré frequencies may be computed using fundamental frequency vectors from one halftone screen in the selected subset and from the additional halftone screen. More additional moiré frequencies may be computed similarly with each of the other halftone screens in the selected subset in combination with the additional halftone screen. In other examples, the additional moiré frequencies may be computed for the additional halftone screen in combination with a plurality of the halftone screens from the selected subset.

At block 418, the method 400 may include selecting the additional halftone screen for inclusion in the halftone screen set based on each additional moiré frequency being greater than an additional predetermined frequency threshold. The additional predetermined frequency threshold may be the same as or different from the predetermined frequency threshold used in block 414. The additional predetermined frequency threshold may vary depending on the moiré order. For example, there may be a first additional predetermined frequency threshold for a first moiré order and a second additional predetermined frequency threshold for a second moiré order. The additional predetermined frequency threshold may be determined according to equation 9. Blocks 416 and 418 may be repeated until an additional halftone screen is selected, for all possible additional halftone screens, a predetermined number of iterations, or the like. Referring to FIG. 2, the method 400 may produce a halftone screen set that includes the black, cyan, magenta, and yellow halftone screens 231-234 in an example.

Figure 5:
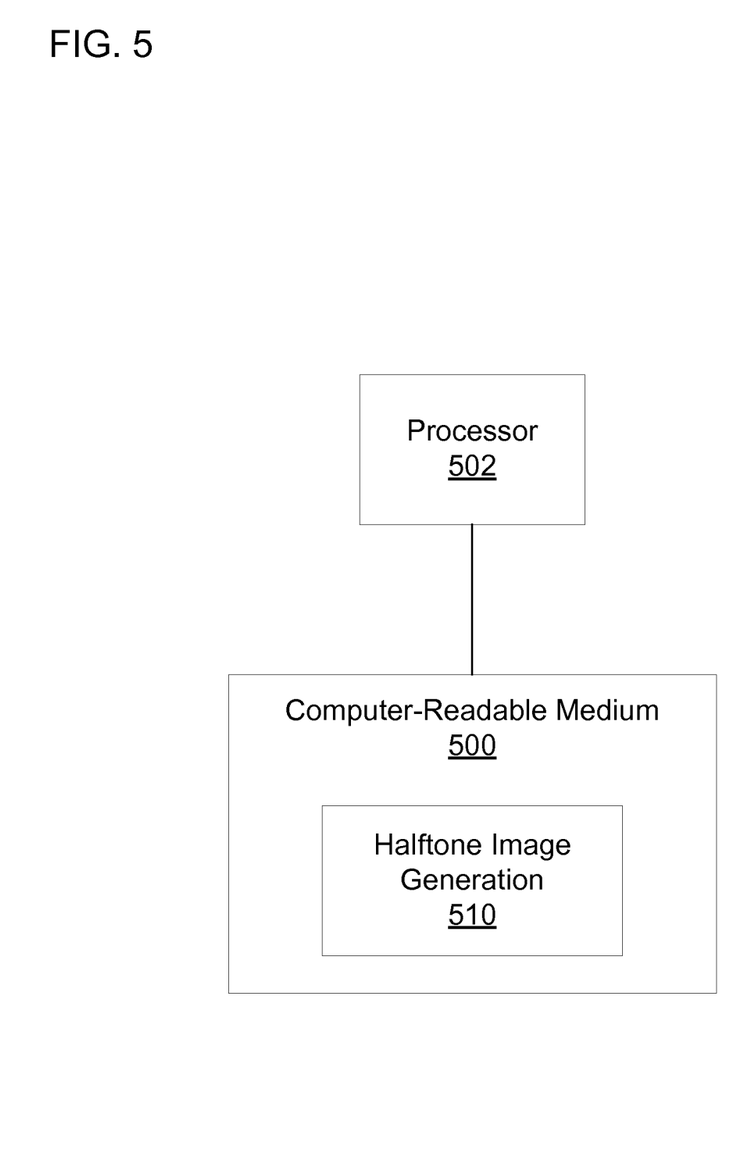
FIG. 5 is a block diagram of an example computer-readable medium including instructions that cause a processor to generate a plurality of halftone images based on a plurality of halftone screens.

FIG. 5 is a block diagram of an example computer-readable medium 500 including instructions that, when executed by a processor 502, cause the processor 502 to generate a plurality of halftone images based on a plurality of halftone screens. The computer-readable medium 500 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), and/or the like. The processor 502 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 500 may include a halftone image generation module 510. As used herein, a "module" (in some examples referred to as a "software module") is a set of instructions that when executed or interpreted by a processor or stored at a processor-readable medium realizes a component or performs a method. The halftone image generation module 510 may cause the processor 502 to generate a plurality of halftone images based on a plurality of halftone screens. For example, the halftone image generation module 510 may cause the processor 502 to receive image data indicating color intensities at various locations in an image. The halftone image generation module 510 may cause the processor 502 to use the plurality of halftone screens to generate a plurality of halftone images from the image data. Referring to FIG. 1, the halftone image generation module 510, when executed by the processor 502, may realize, for example, the color engine 110 or the halftone engine 120.

Each halftone screen from a first subset of the plurality of halftone screens may include a vertical distance and a horizontal distance between neighboring halftone cell centers. The vertical and horizontal distances may each exactly or approximately equal an integer multiple of a dot pitch. Numbers may be approximately equal if they differ by no more than 0.1%, 0.5%, 1%, 2%, 5%, or the like. The neighboring halftone cell centers may be from any neighboring halftone cells. As used herein, the term "neighboring" refers to a first halftone cell and a second halftone cell nearest the first halftone cell. Two halftone cells may be neighboring even if one has multiple equidistant neighbors. The dot pitch may be that of a printer for which the halftone images are generated.

The first subset of the plurality of halftone screens may form a high frequency moiré pattern. For example, all moiré frequencies for the first subset may be above a predetermined threshold. The moiré frequencies may be computed according to equation 7 based on the halftone screens in the first subset in an example. A second subset of the plurality of halftone screens different from the first may also form a high frequency moiré pattern. The second subset may include halftone screens from the first subset but may not be identical to the first subset. All moiré frequencies for the second subset may be above a predetermined threshold in an example. The predetermined threshold for the second subset may be the same as or different from the predetermined threshold for the first subset.

Figure 6:
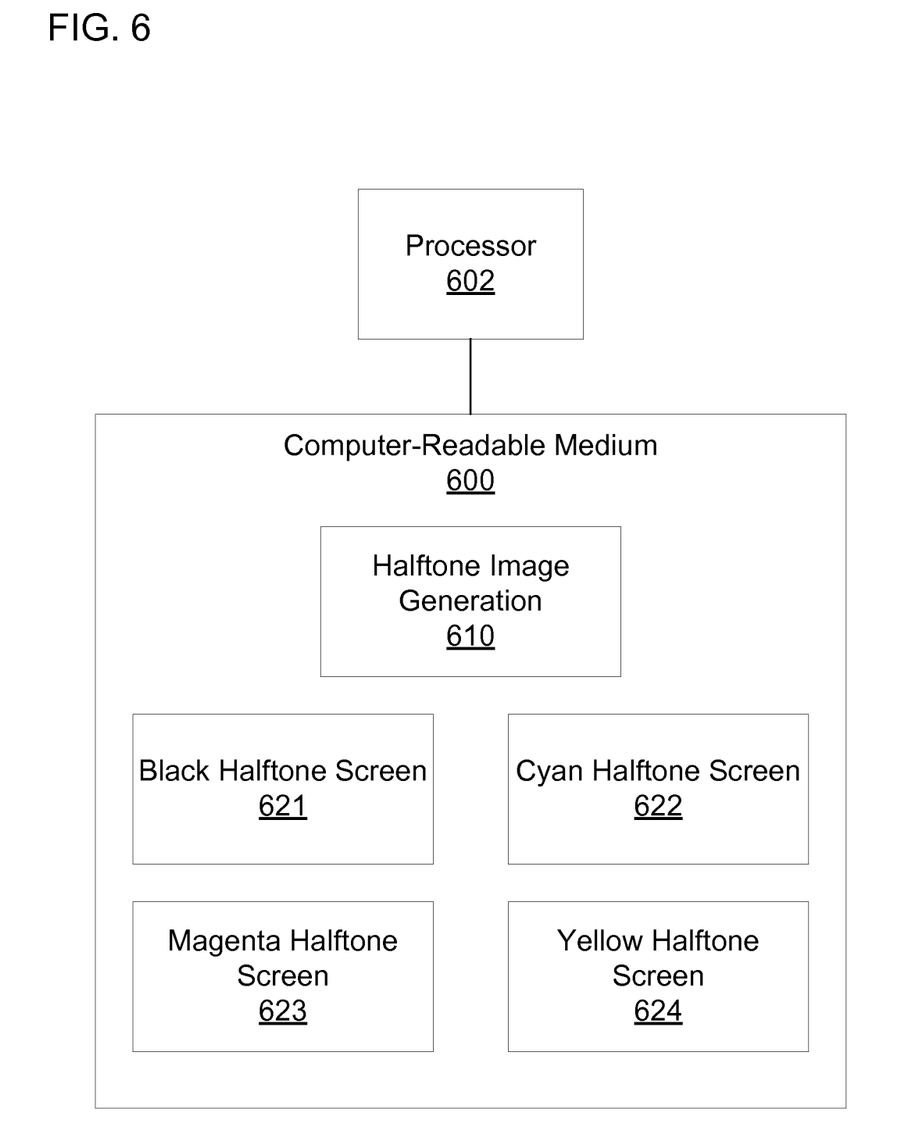
FIG. 6 is a block diagram of another example computer-readable medium including instructions that cause a processor to generate a plurality of halftone images based on a plurality of halftone screens.

FIG. 6 is a block diagram of an example computer-readable medium 600 including instructions that, when executed by a processor 602, cause the processor 602 to generate a plurality of halftone images based on a plurality of halftone screens 621-624. The computer-readable medium 600 may include a halftone image generation module 610. The halftone image generation module 610 may cause the processor 602 to generate a plurality of halftone images based on the plurality of halftone screens 621-624. Referring to FIG. 2, the halftone image generation module 610, when executed by the processor 602, may realize, for example, the color engine 210 or the halftone engine 220. In the illustrated example, the computer-readable medium 600 may include a black halftone screen 621, a cyan halftone screen 622, a magenta halftone screen 623, and a yellow halftone screen 624. In other examples, the computer-readable medium 600 may include more or fewer halftone screens and may include halftone screens for colors besides black, cyan, magenta, and yellow.

The plurality of halftone screens 621-624 may include a first subset of halftone screens, a second subset of halftone screens, a third subset of halftone screens, and a fourth subset of halftone screens. For each halftone screen in the first subset, a horizontal distance and a vertical distance between neighboring cell centers may each exactly or approximately equal an integer multiple of a dot pitch. In an example, for a halftone screen in the second subset, a horizontal distance and a vertical distance between neighboring cell centers may each exactly or approximately equal half an integer multiple of the dot pitch. Accordingly, in an example, each halftone screen in the first subset may have a regularity index of one, and the halftone screen in the second subset may have a regularity index of two.

The first, second, third, and fourth subsets may each form a high frequency moiré pattern. For example, each subset may satisfy equation 7 for all moiré frequency vectors with a moiré order less than or no more than a predetermined threshold. The predetermined threshold may be four, five, six, seven, eight, nine, or the like. The minimum frequencies used to determine whether each subset satisfies equation 7 may be determined based on equation 9 (e.g., using a constant of 80 LPI, 100 LPI, 120 LPI, 150 LPI, 170 LPI, 200 LPI, etc.). The minimum frequencies may be the same for each subset or different between subsets.

In an example, the first subset may include at least three halftone screens, and the second, third, and fourth subsets each may include at least one halftone screen not in the first subset. For example, the first subset may include the black halftone screen 621, the cyan halftone screen 622, and the magenta halftone screen 623. The second subset may include the black halftone screen 621 and the yellow halftone screen 624. The third subset may include the cyan halftone screen 622 and the yellow halftone screen 624. The fourth subset may include the magenta halftone screen 623 and the yellow halftone screen 624. In other examples, the second subset may include the cyan halftone screen 622 or the magenta halftone screen 623 instead of or in addition to the black halftone screen 621. There may be similar variations to the third and fourth subsets.

In an example, a halftone screen in the first subset may include a cell size at least 50% larger than that of another halftone screen in the first subset. For example, the cell sizes may be varied to create the high frequency moiré pattern, to be able to render more color intensities, or the like. In some examples, the magenta halftone screen 623 may have a cell size at least 50% larger than that of the cyan halftone screen 622 or vice versa. The halftone screen with the larger cell size may be selected based on an image to be rendered or characteristics of images expected to be rendered.

In an example for a printer with a DPI of 812.8, the black halftone screen 621 may have an LPI of 225 and a screen angle of 34 degrees. The cyan halftone screen 622 may have an LPI of 225 and an angle of 56 degrees. The magenta halftone screen 623 may have an LPI of 144 and an angle of 45 degrees. The yellow halftone screen 624 may have an LPI of 230 and an angle of 82 degrees. The black, cyan, and magenta halftone screens 621-623 may each have horizontal and vertical distances each exactly or approximately equal to an integer multiple of a dot pitch. The yellow halftone screen 624 may have horizontal and vertical distances each exactly or approximately equal to half of an integer multiple of the dot pitch.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A system, comprising:
   a color engine to separate an image into a plurality of color components; and
   a halftone engine to generate a plurality of halftone images based on the plurality of color components and a plurality of halftone screens,
   wherein for each halftone screen, halftone cell centers for that halftone screen occur at regular or semi-regular distances relative to a dot pitch, and
   wherein the plurality of halftone screens forms a high frequency moiré pattern when the halftone screens are overlaid on each other,
   wherein a regularity index of each halftone screen is less than or equal to 10, wherein the regularity index of a screen is a least common multiple of denominators of components of a basis vector of the screen, and wherein a first component of the basis vector is calculated based on a cell size multiplied by a cosine of a screen angle relative to a dot grid, and a second component of the basis vector is calculated based on the cell size multiplied by a sine of the screen angle.

2. The system of claim 1, wherein the regularity index of each halftone screen is less than or equal to two.

3. The system of claim 1, wherein magnitudes of all moiré frequency vectors for each of a plurality of moiré orders are greater than a corresponding minimum frequency, wherein the corresponding minimum frequency is at least 100 lines per inch divided by the moiré order for each moiré order, wherein a moiré frequency vector is a linear combination of fundamental frequency vectors of the plurality of halftone screens multiplied by integer coefficients, wherein a moiré order is a sum of absolute values of the integer coefficients, and wherein a fundamental frequency vector includes a first component proportional to an inverse of a cell size multiplied by a cosine of a screen angle relative to a dot grid and a second component proportional to the inverse of the cell size multiplied by a sine of the screen angle.

4. The system of claim 3, wherein the corresponding minimum frequency is at least 170 lines per inch divided by the moiré order for each moiré order.

5. A method, comprising:
   determining, using a processor, a plurality of halftone screens, each halftone screen having a granularity metric less than a predetermined granularity threshold;
   computing, using the processor, a plurality of moiré frequencies for each of a plurality of subsets of the plurality of halftone screens; and
   selecting, using the processor, a subset for which each moiré frequency is greater than a predetermined frequency threshold as a halftone screen set.

6. The method of claim 5, further comprising
   computing a plurality of additional moiré frequencies between each halftone screen in the subset and an additional halftone screen having a granularity metric less than an additional predetermined granularity threshold; and
   selecting the additional halftone screen for inclusion in the halftone screen set based on each additional moiré frequency being greater than an additional predetermined frequency threshold.

7. The method of claim 5, wherein determining the plurality of halftone screens with the granularity metric less than the predetermined granularity threshold comprises, for each halftone screen:
   computing rational number representations of horizontal and vertical distances between adjacent halftone cells;
   determining a least common multiple of denominators of the horizontal and vertical distances; and
   determining whether the least common multiple is less than the predetermined granularity threshold.

8. The method of claim 5, wherein computing the plurality of moiré frequencies for each subset comprises:
   determining a plurality of fundamental frequency vectors based on an inverse of a halftone cell size and an angle of each halftone screen;
   computing all linear combinations of the fundamental frequency vectors that have integer coefficients with an absolute sum less than a predetermined moiré order threshold; and
   calculating the plurality of moiré frequencies based on a magnitude of each linear combination.

9. The method of claim 8, wherein selecting the subset comprises selecting a subset for which each moiré frequency of a first order is greater than a first predetermined frequency threshold and each moiré frequency of a second order is greater than a second predetermined frequency threshold.

10. A non-transitory computer-readable medium comprising instructions that, when executed by a processor, cause the processor to:
    generate a plurality of halftone images based on a set of halftone screens,
    wherein each of a first subset of the set of halftone screens includes a vertical distance and a horizontal distance between neighboring halftone cell centers, the vertical and horizontal distances each equal to a first integer multiple of a dot pitch,
    wherein the first subset of halftone screens forms a high frequency moiré pattern, and wherein a second subset of the set of halftone screens different from the first forms a high frequency moiré pattern, wherein a halftone screen in the first subset includes a cell size at least 50% larger than that of another halftone screen in the first subset.

11. The computer-readable medium of claim 10, wherein a halftone screen in the second subset includes a vertical distance and a horizontal distance between halftone cell centers, the vertical and horizontal distances of the halftone screen in the second subset each equal to half of a second integer multiple of a dot pitch.

12. The computer-readable medium of claim 10, wherein a third subset of the set of halftone screens different than the first and second forms a high frequency moiré pattern, and wherein a fourth subset of the set of halftone screens different from the first, second, and third forms a high frequency moiré pattern.

13. The computer-readable medium of claim 12, wherein the first subset includes at least three halftone screens, and wherein the second, third, and fourth subsets each include at least one halftone screen not in the first subset.

14. The system of claim 1, wherein each halftone screen corresponds to one of the plurality of color components.

15. The system of claim 1, wherein the high frequency moiré pattern is an interference pattern produced from the halftone screens being overlaid on each other.

16. The system of claim 1, wherein the regular or semi-regular distance for a first halftone screen is different from the regular or semi-regular distance for a second halftone screen.

* * * * *